(12) United States Patent
Bali et al.

(10) Patent No.: US 7,363,327 B2
(45) Date of Patent: Apr. 22, 2008

(54) CHANGE LOG HANDLER FOR SYNCHRONIZING DATA SOURCES

(75) Inventors: Bahri B. Bali, Danbury, CT (US); Gordan G. Greenlee, Endicott, NY (US)

(73) Assignee: International Business Machines Corporation, Armonk, NY (US)

( * ) Notice: Subject to any disclaimer, the term of this patent is extended or adjusted under 35 U.S.C. 154(b) by 499 days.

(21) Appl. No.: 10/857,405

(22) Filed: May 28, 2004

(65) Prior Publication Data

US 2005/0267921 A1 Dec. 1, 2005

(51) Int. Cl.
*G06F 12/00* (2006.01)

(52) U.S. Cl. .................................... 707/201; 707/204

(58) Field of Classification Search ............... 707/1–4, 707/7–10, 100–102, 104.1, 200–204; 709/203, 709/226; 711/4, 111–114, 202, 203, 161
See application file for complete search history.

(56) References Cited

U.S. PATENT DOCUMENTS

| | | | |
|---|---|---|---|
| 6,044,381 A * | 3/2000 | Boothby et al. ............ 707/201 |
| 6,212,529 B1 * | 4/2001 | Boothby et al. ............ 707/201 |
| 6,377,950 B1 | 4/2002 | Peters et al. |
| 6,449,622 B1 * | 9/2002 | LaRue et al. ............... 707/201 |
| 6,466,951 B1 * | 10/2002 | Birkler et al. .............. 707/201 |
| 6,505,214 B1 * | 1/2003 | Sherman et al. ............ 707/201 |
| 6,516,314 B1 * | 2/2003 | Birkler et al. .................. 707/8 |
| 6,574,657 B1 * | 6/2003 | Dickinson .................... 709/203 |
| 6,581,074 B1 * | 6/2003 | Wong et al. ................. 707/201 |
| 6,654,746 B1 * | 11/2003 | Wong et al. ................... 707/10 |
| 6,718,348 B1 * | 4/2004 | Novak et al. ............... 707/201 |
| 2002/0138389 A1 | 9/2002 | Martone et al. |
| 2003/0145003 A1 | 7/2003 | Yellepeddy et al. |
| 2003/0167409 A1 | 9/2003 | Sussman |

OTHER PUBLICATIONS

Tsai et al., "Analyzing Multiprocessor Cache Behavior Through Data Reference Modeling", Nov. 1993, pp. 1-12.
Blezard et al., "One User, One Password: Integrating UNIX Accounts and Active Directory", Nov. 2002, 1-6.
Allen et al., "Highly Available LDAP", Dec. 2002, pp. 1-9.

\* cited by examiner

*Primary Examiner*—Jeffrey Gaffin
*Assistant Examiner*—Jacques Veillard
(74) *Attorney, Agent, or Firm*—William E. Schiesser; Hoffman, Warnick & D'Alessandro LLC

(57) ABSTRACT

The present invention provides a change log handler than can accommodate a change log having an entry that includes more than one modification operation or multi-valued attributes. The change log handler typically includes a change parser for parsing change attributes corresponding to the change log that identify changes to the first data source. Such changes can include a plurality of modification operations as reflected in a single entry of the change log. The change log handler also includes a change reflector for applying the changes to a second data source.

17 Claims, 5 Drawing Sheets

CHANGE LOG HANDLER FOR SYNCHRONIZING DATA SOURCES

FIELD OF THE INVENTION

In general, the present invention provides a change log handler for synchronizing data sources. Specifically, the present invention provides change log handler that can accommodate a change log having entries that include multiple modification operations and/or multi-valued attributes.

BACKGROUND OF THE INVENTION

Data sources such as directories have become key solutions of successful large-scale IT operations and e-business applications. The implementation and utilization of centralized, corporate-wide directories are highly demanded projects because of the dramatic cost reduction they provide over many distributed directories in varying sizes. One type of response to these requirements has been provided by International Business Machines Corp. of Armonk, N.Y. (IBM). Specifically, IBM has introduced solutions such as the IBM Directory Server (IDS), which implements Lightweight Directory Access Protocol (LDAP), and IBM Directory Integrator (IDI), which is designed to transform data between different data sources such as LDAP directories.

In general, IDI technology helps developers integrate different data sources by abstracting the technical details of low-level application programming interface (API) calls required to interact with the various data sources, formats and protocols. IDI is considered to be a powerful tool for integrating two or more directories. As such, it is often used to synchronize two directories. Specifically, in a common scenario, two directories might need to be synchronized such that changes to one directory can be applied to another. Under the current IDI implementation, the IDI technology will interact with an IDS change log to determine the changes made to the first directory. Such changes can then be synchronized to the second directory.

Unfortunately, the current IDI implementation is not without drawbacks. For example, although IDI includes software components (e.g., IDI connectors) that can be used to synchronize directories using change logs, it lacks the techniques and features that are needed for full synchronization. Specifically, one impediment imposed by IDI connectors is that they fail to recognize multiple modification operations (e.g., add, delete, modify/replace) that may be stored in a single change log entry. Moreover, current IDI technology assumes that a modification specified in a change log entry is always a replace. This could create a serious problem when full synchronization for multi-valued attributes is desired between two directories.

In view of the foregoing, there exists a need for a change log handler for synchronizing data sources. Specifically, a need exists for a change log handler that is capable of accommodating change log entries that include multiple modification operations and/or multi-valued attributes so that full synchronizing between two data sources can be provided.

SUMMARY OF THE INVENTION

In general, the present invention provides a change log handler for synchronizing data sources such as directories. Specifically, the present invention provides a change log handler that can accommodate a change log having an entry that includes more than one modification operation or value. The change log handler typically includes a change parser for parsing change attributes corresponding to the change log that identify changes to the first data source. Such changes can include a plurality of modification operations as reflected in a single entry of the change log. The change log handler also includes a change reflector for applying the changes to a second data source.

A first aspect of the present invention provides a computer-implemented method for synchronizing data sources, comprising: parsing a change log having a plurality of entries, wherein at least one of the plurality of entries includes a plurality of modification operations for a first data source; determining changes to the first data source based on the parsing, wherein the changes include the plurality of modification operations of the at least one of the plurality of entries; and applying the changes to a second data source.

A second aspect of the present invention provides a computer-implemented method for synchronizing data sources, comprising: receiving change attributes corresponding to a change log having a plurality of entries, wherein at least one of the plurality of entries includes a plurality of modification operations for a first data source, and wherein the change attributes identify changes to the first data source as recorded in the change log; parsing the change attributes to determine the changes, wherein the changes include the plurality of modification operations of the at least one of the plurality of entries; and applying the changes to a second data source.

A third aspect of the present invention provides a change log handler for synchronizing data sources, comprising: a change parser for parsing change attributes corresponding to a change log having a plurality of entries, wherein at least one of the plurality of entries includes a plurality of modification operations for a first data source, and wherein the change attributes identify changes to the first data source as recorded in the change log; and a change reflector for applying the changes to a second data source, wherein the changes applied include the plurality of modification operations of the at least one of the plurality of entries.

A fourth aspect of the present invention provides a program product stored on a recordable medium for synchronizing data sources, which when executed, comprises: program code for parsing change attributes corresponding to a change log having a plurality of entries, wherein at least one of the plurality of entries includes a plurality of modification operations for a first data source, and wherein the change attributes identify changes to the first data source as recorded in the change log; and program code for applying the changes to a second data source, wherein the changes applied include the plurality of modification operations of the at least one of the plurality of entries.

A fifth aspect of the present invention provides a system for deploying an application for synchronizing data sources, comprising: a computer infrastructure being operable to: receive change attributes corresponding to a change log having a plurality of entries, wherein at least one of the plurality of entries includes a plurality of modification operations for a first data source, and wherein the change attributes identify changes to the first data source as recorded in the change log; parse the change attributes to determine the changes, wherein the changes include the plurality of modification operations of the at least one of the plurality of entries; and apply the changes to a second data source.

A sixth aspect of the present invention provides computer software embodied in a propagated signal for synchronizing data sources, the computer software comprising instructions to cause a computer system to perform the following functions: parse change attributes corresponding to a change log having a plurality of entries, wherein at least one of the plurality of entries includes a plurality of modification operations for a first data source, and wherein the change attributes identify changes to the first data source as recorded in the change log; and apply the changes to a second data source, wherein the changes applied include the plurality of modification operations of the at least one of the plurality of entries.

Therefore, the present invention provides a change log handler for synchronizing data sources.

BRIEF DESCRIPTION OF THE DRAWINGS

These and other features of this invention will be more readily understood from the following detailed description of the various aspects of the invention taken in conjunction with the accompanying drawings in which.

Figure 1:
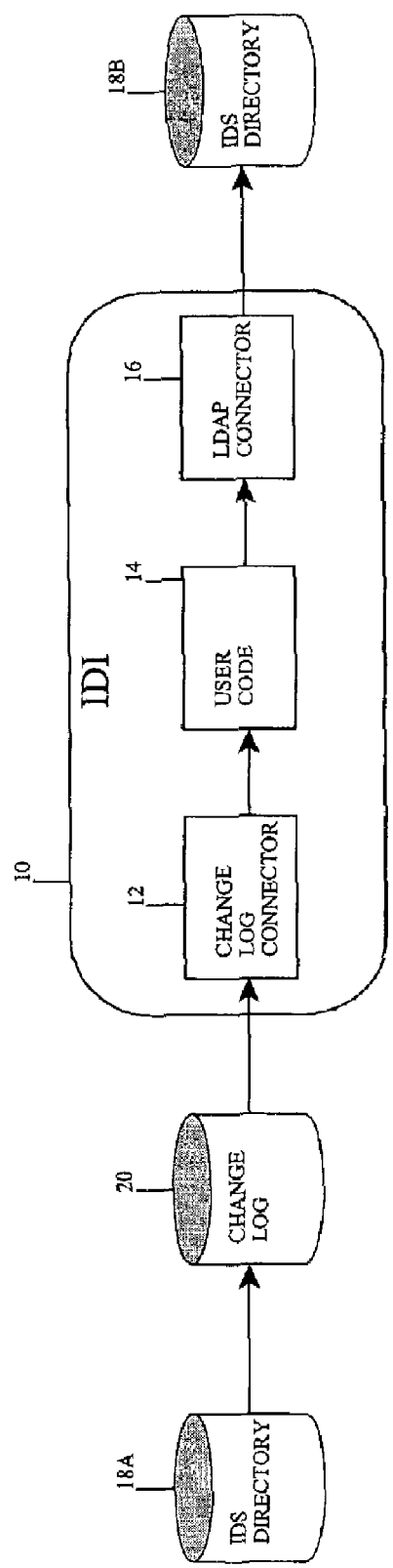
FIG. 1 depicts related art IBM Directory Integrator (IDI) technology.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

BEST MODE FOR CARRYING OUT THE INVENTION

For convenience purposes, the Best Mode for Carrying Out the Invention will have the following sections:

I. General Description
II. IDI Technology
III. Change Log Handler
IV. Computerized Implementation I. General Description As indicated above, the present invention provides a change log handler for synchronizing data sources such as directories. Specifically, the present invention provides a change log handler that can accommodate a change log having an entry that includes more than one modification operation or value. The change log handler typically includes a change parser for parsing change attributes corresponding to the change log that identify changes to the first data source. Such changes can include a plurality of modification operations as reflected in a single entry of the change log. The change log handler also includes a change reflector for applying the changes to a second data source.

II. IDI Technology

Prior to discussing the change log handler of the present invention, a background of related IDI technology will be given. Referring to FIG. 1, an illustrative IDI 10 is shown. As depicted, IDI 10 includes change log connector 12, user code 14 and LDAP connector 16. In general, IDI 10 connects data sources such as IDS directories 18A-B. Changes made to data values in IDS directory 18A will be reflected in IDS change log 20. To this extent, change log 20 typically comprises a series of entries denoting the various modification operations that were performed on the data values within IDS directory 18A. Specifically, the entries of change log 20 include attribute and value pairs each of which contain specific information about the actual change to the data values within IDS directory 18A. Listed below is an illustrative change log entry:

changenumber=3471119,cn=changelog
objectclass=top
objectclass=changelogentry
objectclass=ibm-changelog
changenumber=3471119
targetdn=uid="123456897",c=us,ou=bluepages, o=ibm.com
changetype=modify Change log connector 12 is a software component designed to access change log 20 entries such as the entry set forth above. When change log connector 12 retrieves an entry from change log 20, it parses the attributes and their associated values including the ones stored in the "changes" attribute shown in the above illustrative entry. Attribute and value pairs extracted by change log connector 12 are stored in an IDI data structure called a "work entry." Once the changes to IDS directory 18A are extracted by change log connector 12, LDAP connector 16 will access IDS directory 18B to modify the data values therein accordingly.

Unfortunately, IDI 10 of FIG. 1 is not without its drawbacks. For example, change log connector 12 does not currently map the modification operations (e.g., add, delete, replace, etc.) stored in the changes attribute. In other words, attribute and value pairs stored in the change attributes are not associated with their modification operators. For example, user code 14 and LDAP connector 16 will not know that the value of the "cn" attribute, "John Doe" is actually to be deleted. Thus, after excluding modification operators, IDI 10 obtains the work entry shown below:

| ATTRIBUTE | VALUES |
|---|---|
| CHANGENUMBER | 347119 |
| OBJECTCLASS | top            changelogentry            ibm-changelog |
| TARGETDN | uid="123456897",c=us,ou=bludpages,0=ibm.com |
| CHANGETYPE | modify |
| CHANGETIME | 20,030,927,053,544 |
| IBM-CHANGEINITIATORSNAME | CN=ROOT |
| ADDITIONAL | Test. |

-continued

| ATTRIBUTE | VALUES | |
|---|---|---|
| TIELINE | 123-4567 | |
| DIRECTORYALIAS | CT | NORTHEAST |
| CN | John Doe | |
| CHANGES | replace: additional ↵additional: Test. ↵-↵replace: tieline ↵tieline: 123-4567 ↵-↵delete: usercertificate ↵-↵replace: userpassword ↵-↵add: directoryalias ↵directoryalias: CT ↵directoryalias: NORTHEAST ↵-↵delete: cn ↵cn: John Doe ↵-↵ | |

When this entry is processed by LDAP connector 16, all attribute and value pairs are associated with the modification operation "replace." This will cause the "cn" attribute's value associated with "John Doe" to replace any existing value in the corresponding LDAP entry of IDS directory 18B accessed by LDAP connector 16. Accordingly, the existing IDI 10 technology shown in FIG. 1 fails to accommodate a single entry of change log 20 that might contain multiple modification operations. Another problem with IDI 10 arises when multi-valued attributes are present, such as the attribute "directoryalias" in the above example. Specifically, although the modification operation for the attribute is already "replace," only the last value of the attribute will be applied to IDS directory 18B. Thus, only the value "NORTHEAST" will appear in IDS directory 18B and not "CT." Both of these issues are related to the generic structure of IDI 10, which is helpful for other IDI connectors such as a DB2 connector, and which does not involve multi-valued attributes or multiple modification operations.

To address these drawbacks a change log handler is provided under the present invention to provide the needed "full synchronization" between data sources such as directories 18A-B.

III. Change Log Handler

Figure 2:
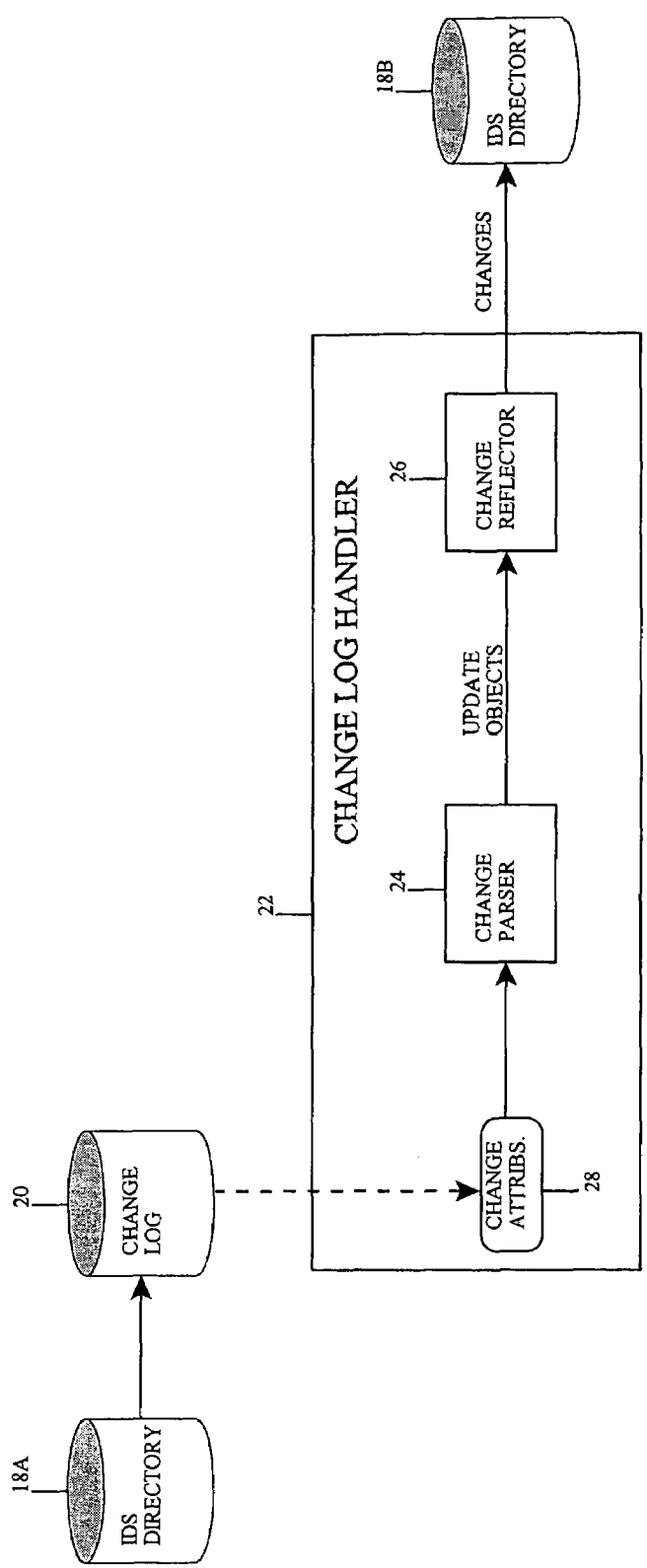
FIG. 2 depicts a change log handler according to the present invention.

Referring now to FIG. 2, change log handler 22 according to the present invention is shown. In general, change log handler 22 solves the above-stated drawbacks by applying techniques that involve change log parsing, resolution of individual modification operations, and application of changes to a target directory or data source such as that using an LDAP compatible API (e.g., Java Naming and Directory Interface). It should be understood in advance, that the functions of change log handler 22 will be described in conjunction with providing full synchronization between IDS directories 18A-B. However, the same teachings could be applied to provide full synchronization between any two types of data sources (e.g., DB2 databases).

In any event, as depicted in FIG. 2, change log handler 22 includes change parser 24 and change reflector 26. In a typical embodiment, change log 20 is parsed to yield change attributes 28, which are provided to change parser 24. Change reflector 26 will call change parser 24 to parse the values of change attributes 28. The parsing process will determine: (1) the type of data obtained from each change log entry so that it can be sent to IDS directory 18B with the correct encoding and/or data type (e.g., string or byte array); and (2) the changes that were made to the data values within IDS directory 18A. As indicated above, a single entry in change log 20 might include multi-valued attributes or modification operations. Change parser 24 will parse change attributes 28 such that all such multi-valued attributes or modification operations are identified and handled appropriately. Specifically, change parser 24 will receive change attributes 28, which under the illustrative embodiment described herein is a valid LDIF string. Based on the types of changes (e.g., add, delete, modify, etc.), change parser 24 returns individual LDAP update objects to change reflector 26. Thus change parser 24 maps the modification operations (e.g., add, delete, replace, etc.) stored in the change attributes 28. In other words, attribute and value pairs stored in the change attributes 28 are associated with their modification operators. Attributes stored in these objects can represented by a data structure (e.g., named "change attributes"). Change reflector 26 iterates through the LDAP update objects and sends the requests represented thereby to IDS directory 18B whose connection can be obtained by IDI 10 (FIG. 1) or any other LDAP connection provider.

Figure 3:
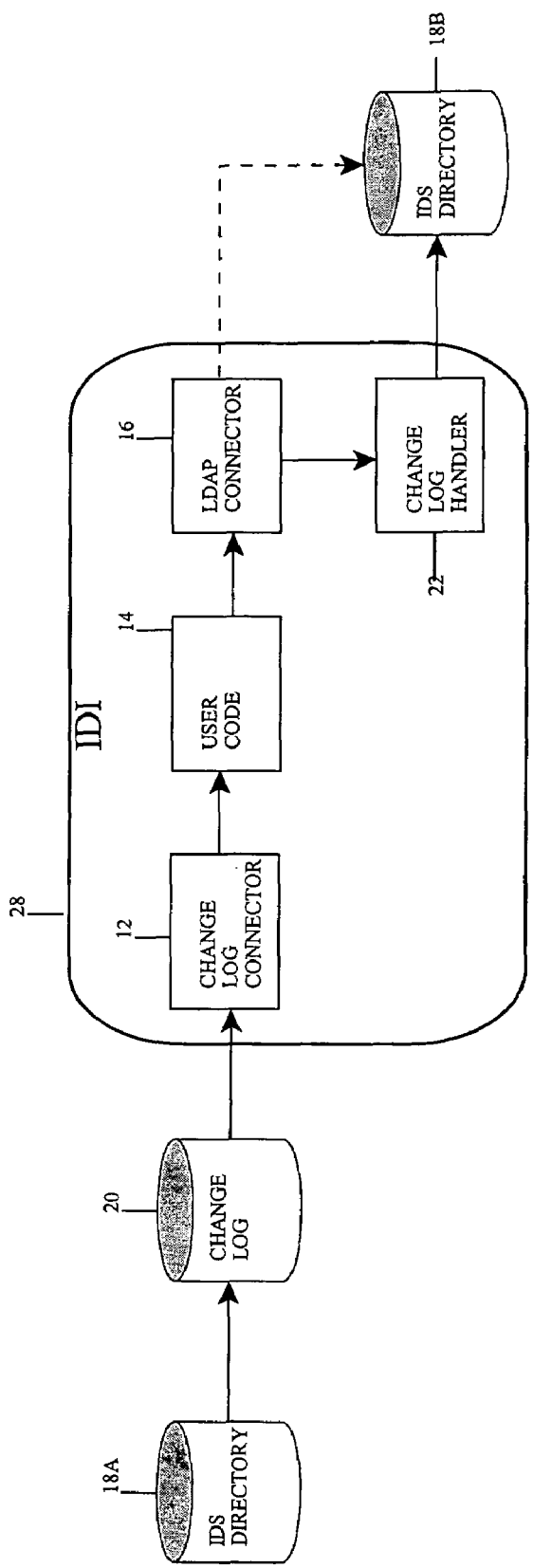
FIG. 3 depicts the change log handler of FIG. 2 as integrated with the IDI of FIG. 1 according to one illustrative embodiment of the present invention.

To this extent, FIG. 3 depicts the integration of change log handler 22 with IDI technology to yield IDI 28 in accordance with the present invention. As shown, change log handler 22 resides between LDAP connector 16 and IDS directory 18B. When first initialized, LDAP connector 16 establishes a (LDAP) connection to directory 18B. At the same time, change log handler 22 is also initialized and is passed the connection obtained by LDAP connector 16. Since change log handler 22 overrides the operation method (e.g., the update and/or add) of LDAP connector 16, it will be responsible for applying the changes to IDS directory 18B. Change parser 24 (FIG. 2) of change log handler 22 is passed the value of the change attributes, which is first obtained by change log connector 12. This value is passed through other components in IDI 28 until it reaches LDAP connector 16, which acts as a data provider for change log handler 22 after it is initialized.

As indicated above, change parser 24 (FIG. 2) will parse the changes attribute to determine a data type and to determine the changes made to IDS directory 18A. Such changes can include multi-valued attributes or modification operations described/reflected within a single entry of change log 20. The determined changes will then be applied to IDS directory 18B by change reflector 26 (FIG. 2).

Under the present invention, change reflector 26 can work in single or batch mode. In batch mode, change reflector 26 executes only one API call to send the update objects to IDS directory 18B. For example, the change attribute shown in the table above contains six updates for different attributes. In batch mode, these six updates are sent in one call. Therefore, batch mode improves performance by reducing the number of API calls. Single mode differs in that change reflector 26 executes one API call per update. Thus, applying the changes shown in the above table will result in six API calls. Single mode's advantage is improved error handling and debugging. That is, single mode allows errors for individual updates to be ignored, if specified. This means that the remaining updates will be executed even if one of them fails.

It should be understood that use of change log handler 22 is not limited to an IDI context only. For example, it can be used in other environments where LDAP-enabled programs may need to access and process change log entries. Regardless, some potential advantages of change log handler 22 include the following:

Abstract technicalities of parsing change log entries: Using the components provided by change log handler 22, the author of an LDAP-enabled program only needs to focus on how to apply his/her business logic to the LDAP update objects collected by the change parser.

Enablement of programmatic full synchronization of directories: A stand-alone LDAP-enabled program can utilize the change reflector to establish a full synchronization between two directories.

Enablement of programmatic customized synchronization or replication of directories: The update objects collected by the change parser can be manipulated easily by programs to filter out certain attributes or change their names and/or values to implement a customized synchronization and/or replication rather than a full, one-to-one synchronization.

Determination of the data type of attribute values automatically. As indicated above, the change parser automatically determines the type of data stored in an attribute's value. Attribute values that contain non-ASCII (e.g., characters over ASCII 127, UTF8 characters, etc.) should be sent to the target directory (e.g. directory 18B) as byte arrays to preserve their original encodings. The change parser determines whether an attribute value must be sent as a simple String or byte array by checking its content based on rules outlined in the LDIF RTC document. IDI 10 (FIG. 1) previously left this determination to the programmer.

Figure 4:
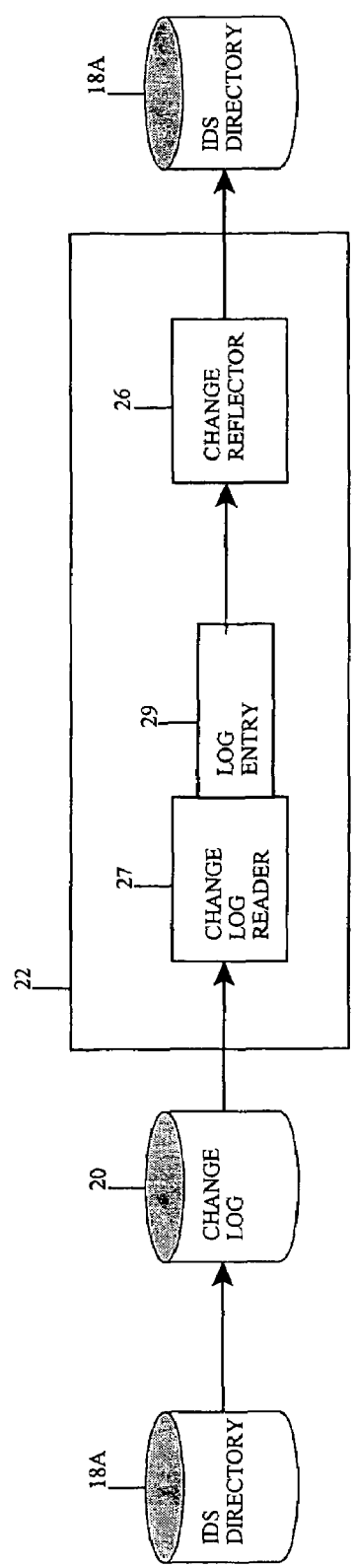
FIG. 4 depicts the change log handler of FIG. 2 according to another embodiment of the present invention.

It should be understood that as shown in FIG. 4, change log handler 22 of the present invention can include other components to broaden its functionality. For example, change log handler 22 can include a change log reader 27 and a change log entry 29. Both of these components are abstract data structures that define certain functions and sub-components to be implemented by the change log handler exploiters. Programs implementing these data structures should employ business logic required to access a specific directory server (e.g., IDS, iPlanet, etc.) and represent a change log entry obtained from the server in a generic way so that it can be processed by virtually any other program or component such as the change reflector and change parser. In other words, an implementing program of the change log reader 27 for a particular directory product should be able to use appropriate techniques to access, read, and represent a change log entry 29. For example, a program that needs to access the change log 20 should login using a privileged account or the like designated for change log access.

In addition, as indicated above, the change log handler of the present invention can be modified to convert change log entries to objects that can be used to apply changes to data sources other than directories. For example, a modified version of the change parser could return instances of SQL update statement objects instead of LDAP update objects if the change log handler was to function between a directory server and a database (e.g., DB2) server.

IV. Computerized Implementation

Figure 5:
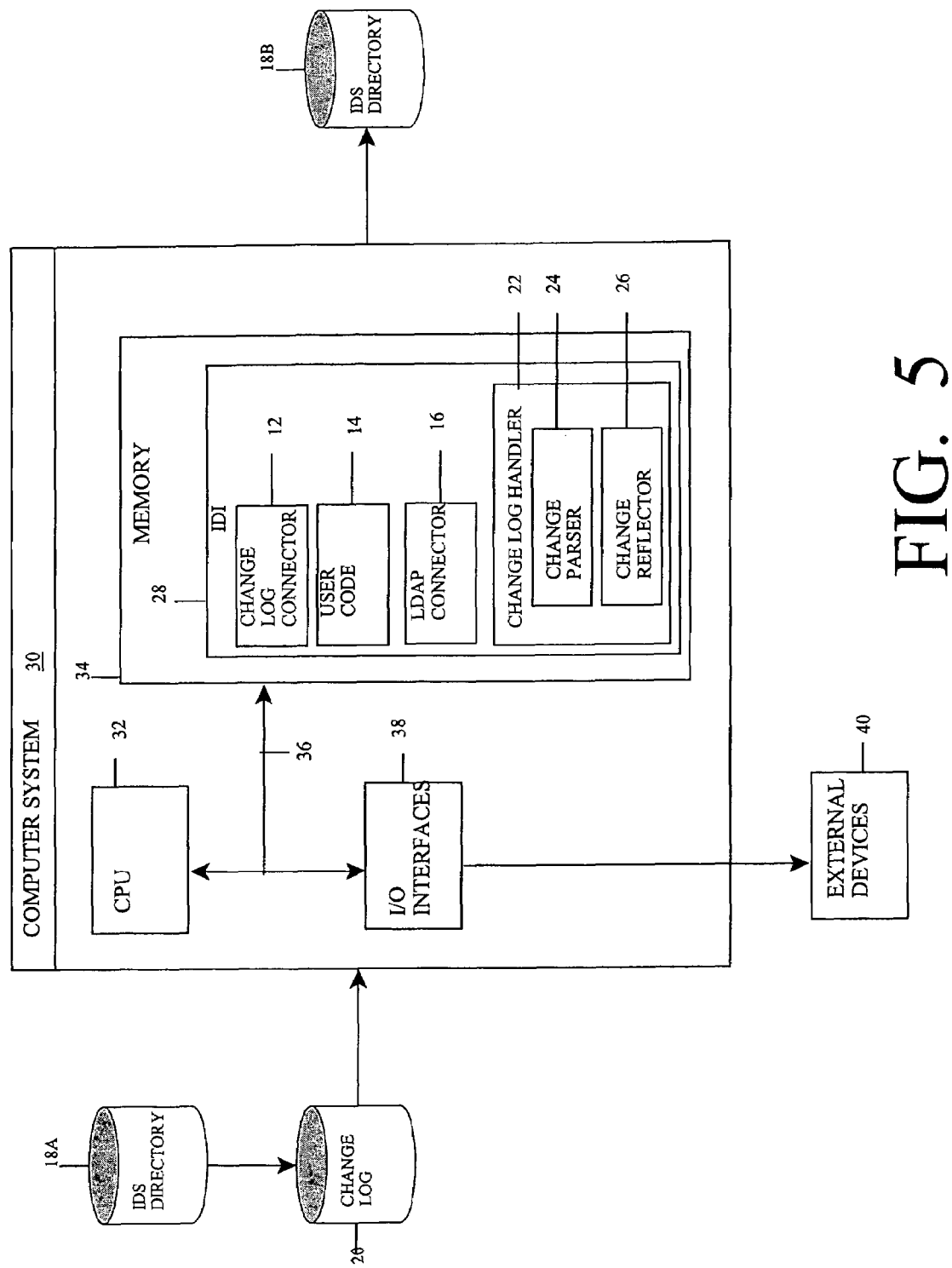
FIG. 5 depicts the illustrative embodiment of FIG. 3 in greater detail.

Referring now to FIG. 5, a more specific computerized implementation of the present invention is shown. As depicted, computer system 30 generally includes central processing unit (CPU) 32, memory 34, bus 36, input/output (I/O) interfaces 38 and external devices/resources 40. CPU 32 may comprise a single processing unit, or be distributed across one or more processing units in one or more locations, e.g., on a client and server. Memory 34 may comprise any known type of data storage and/or transmission media, including magnetic media, optical media, random access memory (RAM), read-only memory (ROM), a data cache, a data object, etc. Moreover, similar to CPU 32, memory 34 may reside at a single physical location, comprising one or more types of data storage, or be distributed across a plurality of physical systems in various forms.

I/O interfaces 38 may comprise any system for exchanging information to/from an external source. External devices/resources 40 may comprise any known type of external device, including speakers, a CRT, LED screen, hand-held device, keyboard, mouse, voice recognition system, speech output system, printer, monitor/display, facsimile, pager, etc. Bus 36 provides a communication link between each of the components in computer system 30 and likewise may comprise any known type of transmission link, including electrical, optical, wireless, etc.

It should be understood that the teachings of the present invention could be implemented on a stand alone system as shown in FIG. 5, or over a network. For example, directories 18A-B could be connected to different, interconnected computer systems. Communication between such computer systems could occur in any known manner. For example, communication could occur directly, or over a network such as the Internet, a local area network (LAN), a wide area network (WAN), a virtual private network (VPN), etc. In any event, communication could occur via a direct hardwired connection (e.g., serial port), or via an addressable connection that may utilize any combination of wireline and/or wireless transmission methods. Moreover, conventional network connectivity, such as Token Ring, Ethernet, WiFi or other conventional communications standards could be used. Still yet, connectivity could be provided by conventional TCP/IP sockets-based protocol. In this instance, an Internet service provider could be used to establish interconnectivity.

Shown in memory 34 is IDI 28 of FIG. 2 as provided under the present invention. Specifically, IDI 28 includes change log connector 12, user code 14 and LDAP connector 16. IDI 28 further includes change log handler 22, which itself includes change parser 24 and change reflector 26. As explained in detail above, change log handler 22 provides full synchronization between directories 18A-B. However, as also explained above, the teachings of the present invention are not limited to IDS directories. Rather, the present invention could be utilized to provide synchronization between any two data sources. Such data sources could each include one or more storage devices, such as a magnetic disk drive or an optical disk drive. In another embodiment, such data sources could each include data distributed across, for example, a local area network (LAN), wide area network (WAN) or a storage area network (SAN) (not shown).

As described above, when a user makes changes to directory 18A, those changes will be reflected in one or more entries of change log 20. To this end, each entry of change log 20 could include multiple modification operations or multi-valued attributes. In any event, change log 20 will be parsed by change log connector 12 to provide change attributes that describe the changes. The change attributes will be passed to LDAP connector 16 and then to change parser 24. After being called by change reflector 26, change parser 24 will determine the type of data obtained from each change log entry. Change parser 24 will also parse the change attributes to determine the changes made to directory 18A. Change parser 24 will be able to determine whether a change log entry includes multi-valued attributes or multiple modification operations. After determining the changes, change parser 24 will produce update objects and pass the same to change reflector, which will then use the update objects to apply the changes to directory 18B.

It should be appreciated that change log handler 22 under the present invention need not be incorporated within IDI technology. Rather, change log handler 22 could be provided without IDI technology. In such an event, change log 20 could be parsed by change parser 24 to yield change attributes and/or update objects. It should also be understood that the present invention can be realized in hardware, software, a propagated signal, or any combination thereof. Any kind of computer/server system(s)—or other apparatus adapted for carrying out the methods described herein—is suited. A typical combination of hardware and software could be a general purpose computer system with a computer program that, when loaded and executed, carries out the respective methods described herein. Alternatively, a specific use computer, containing specialized hardware for carrying out one or more of the functional tasks of the invention, could be utilized. The present invention can also be embedded in a computer program product or a propagated signal, which comprises all the respective features enabling the implementation of the methods described herein, and which—when loaded in a computer system—is able to carry out these methods. Computer program, propagated signal, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

In a current implementation, change log handler 22 is implemented in Java and includes the following Java classes and interfaces: ChangeReflector, ChangeParser, ChangeLogEntry, AttributeIdCollection, AttributeSet, and LogStream. The classes ChangeReflector, ChangeParser, AttributeIdCollection, and AttributeSet represent "change reflector," "change parser," "identifiers of the change attributes," and "change attributes" components, respectively. LogStream is a convenience class for writing messages to IDI's log from other change log handler classes. The abstract class for change log reader (ChangeLogReader) is in the development class.

The ChangeReflector class relies on Java Naming and Directory Interface (JNDI) classes to perform LDAP operations such as sub-context creation (add), sub-context deletion (delete), and attribute modifications. It requires a directory context (e.g., connection to the target LDAP server), which can be established by an LDAP-enabled program or IDI. The ChangeReflector class provides public methods for applying changes to the target directory.

The ChangeParser class parses change operations. In the change log, change operations are stored as LDIF in the attributes "changes." LDAP compliant directory server products are expected to store changes in LDIF format to remain standard. The ChangeParser class has public methods which can be invoked to parse changes and obtain LDAP update objects (e.g., JNDI classes BasicAttributes, ModificationItem). It also provides convenient methods to convert other LDAP update objects back to LDIF.

The ChangeLogEntry class represents a change log entry retrieved from an LDAP directory. It contains public methods to allow the classes ChangeParser and ChangeReflector and other client programs to easily access the components of a change log entry (e.g., change number, target distinguished name, changes, etc.).

The AttributeSet class is a simple container that extends the JNDI class BasicAttributes. It is used to store attributes and their associated values extracted by the ChangeParser class. The AttributeSet class is a helper class used by the class AttributeSet to store identifiers of the attributes.

The foregoing description of the preferred embodiments of this invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims. For example, the configuration of change log handler 22 of FIGS. 2-5 is intended to be illustrative only.

We claim:

1. A computer-implemented method for synchronizing data sources, comprising:
    parsing a change log having a plurality of entries, wherein at least one of the plurality of entries includes a plurality of modification operations for a first data source;
    determining changes to the first data source based on the parsing, wherein the changes include the plurality of modification operations of the at least one of the plurality of entries; and
    applying the changes to a second data source to synchronize the second data source with the first data source.

2. The method of claim 1, further comprising detecting a type of data for each of the plurality log entries.

3. The method of claim 1, wherein the first data source and the second data sources are directories.

4. The method of claim 3, wherein the directories are LDAP directories.

5. The method of claim 1, wherein the first data source and the second data source are databases.

6. The method of claim 1, wherein the change log is an IBM Directory Server (IDS) change log.

7. The method of claim 1, wherein the parsing step comprising parsing change attributes corresponding to the change log, and wherein the change attributes identify the changes to the first data source as recorded in the change log.

8. The method of claim 7, further comprising receiving the change attributes from a connector in communication with the change log.

9. The method of claim 1, wherein the connector is part of an IBM Directory Integrator (IDI).

10. A computer-implemented method for synchronizing data sources, comprising:
    receiving change attributes corresponding to a change log having a plurality of entries, wherein ateast one of the plurality of entries includes a plurality of modification operations for a first data source, and wherein the change attributes identify changes to the first data source as recorded in the change log;
    parsing the change attributes to determine the changes, wherein the changes include the plurality of modification operations of the ateast one of the plurality of entries; and
    applying the changes to a second data source to synchronize the second data source with the first data source.

11. The method of claim 10, further comprising detecting a type of data for each of the plurality log entries.

12. The method of claim 10, wherein the first data source and the second data sources are directories.

13. The method of claim 12, wherein the directories are LDAP directories.

14. The method of claim 10, wherein the first data source and the second data source are databases.

15. The method of claim 10, wherein the change log is an IBM Directory Server (IDS) change log.

16. The method of claim 15, wherein the receiving step comprises receiving the change attributes from a connector in communication with the change log.

17. The method of claim 10, wherein the connector is part of an IBM Directory Integrator (IDI).

* * * * *